United States Patent [19]
Webb

[11] 3,925,592
[45] Dec. 9, 1975

[54] HOLDER FOR ELECTRICAL EQUIPMENT

[75] Inventor: Alan David Webb, Hinchley Wood, England

[73] Assignee: The British Petroleum Company Limited, London, England

[22] Filed: Mar. 12, 1974

[21] Appl. No.: 450,319

[30] Foreign Application Priority Data
Mar. 15, 1973 United Kingdom............... 12405/73

[52] U.S. Cl. ............... 174/17 LF; 136/6 P; 220/228
[51] Int. Cl.² .......................................... H05K 5/00
[58] Field of Search ............... 174/17 R, 17 LF, 37; 136/6 P, 6 R, 166; 220/228

[56] References Cited
UNITED STATES PATENTS

| | | |
|---|---|---|
| 340,859 | 4/1886 | Carley.............................. 220/228 X |
| 634,677 | 10/1899 | Vaughn............................... 220/228 |
| 902,166 | 10/1908 | Perlich........................... 220/228 X |
| 1,948,820 | 2/1934 | Lasker................................ 220/228 |
| 2,277,398 | 3/1942 | Graver........................... 220/228 X |
| 3,482,030 | 12/1969 | Wisniewski............................ 174/37 |
| 3,515,592 | 6/1970 | Nishimura............................ 136/6 P |
| 3,589,940 | 6/1971 | Bridge et al........................ 136/6 P |

*Primary Examiner*—J. V. Truhe
*Assistant Examiner*—David A. Tone
*Attorney, Agent, or Firm*—Morgan, Finnegan, Pine, Foley & Lee

[57] ABSTRACT

A holder for an electrical battery for use under water comprises (1) a container having inner and outer walls defining an annular space therebetween and (2) a cover having a downwardly extending skirt co-operating with the annular space. In use a battery is held in the container which is then filled with a lighter than water non electrically conducting oil.

8 Claims, 2 Drawing Figures

HOLDER FOR ELECTRICAL EQUIPMENT

This invention relates to a holder for protecting electrical equipment, e.g. a battery and preventing water from contacting the equipment when the latter is submerged under water.

In recent years there has been a rapid growth in the exploration and development of oilfields located below the sea, and some of the oil fields which have been discovered have been in areas where there is no local electrical supply on the nearest land and where to bring power by a cable would be very expensive. Electrical power is frequently required for controlling oil production e.g. for actuating valves and a need therefore exists for a battery which can be used under water without any risk of contamination by the water.

A holder has now been invented for protecting electrical equipment e.g. a battery and which holder prevents water from contacting the equipment when submerged under water.

Thus, according to the present invention a holder suitable for the protection of electrical equipment in an underwater location comprises a container having an inner wall and an outer wall defining space therebetween and a removable cover having a downwardly extending skirt co-operating with the space in a manner such that, when the container is filled with an electrically non conducting water immiscible liquid and the holder submerged underwater, then ingress of water into the container and egress of liquid from the container are prevented, and access means for an electrical connection between the interior of the compartment and the exterior.

The holder can be of any cross-section but preferably is substantially circular cross-section.

The access means is preferably provided by having the inner and outer walls and the skirt so made that a cable can pass from the equipment in the container over the inner wall, under the extremity of the skirt and over the outer wall of the exterior. Alternatively the cable can pass through a seal in the base of the container.

Preferably the container is cylindrical and more preferably the space is defined by the inner and outer walls forming surfaces of two coaxial cylinders.

Preferably the skirt of the cover is of sufficient size to reach more than ½ way down into the space defined by the inner and outer walls more preferably at least ¾ of the way down and most preferably at least 9/10 of the way down.

Preferably the cover has a closeable aperture which is below the level of the rim of the outer wall for permitting escape of excess liquid when the cover is moved into position.

Preferably the outer wall is higher than the inner wall and the cover has an upwardly and outwardly extending projection fitting over the outer wall of the container.

Preferably the container has means for supporting the cells with their base not in contact with the bottom of the container to permit the cells to be totally surrounded by liquid. Preferably the means for supporting comprises a clamp or bracket.

When the cells of a battery are placed in the container they are completely covered with a non-electrically conducting liquid preferably having a specific gravity less than water e.g. a hydrocarbon oil, before placing the cover over them. Preferably the oil enters the cells themselves filling the space above the electrolyte with oil.

Preferably the container is enclosed by a frame which is supported on a steel base and has anodes attached for cathodic protection.

Ballast weights are preferably provided on the steel base.

According to the invention a method of employing a holder as hereinbefore described comprises installing a battery in the container of the holder covering the battery with a water immiscible non electrically conducting liquid, fixing the cover in position and lowering the holder and battery to an underwater location.

The invention is illustrated with reference to the accompanying drawings in which.

Figure 1:
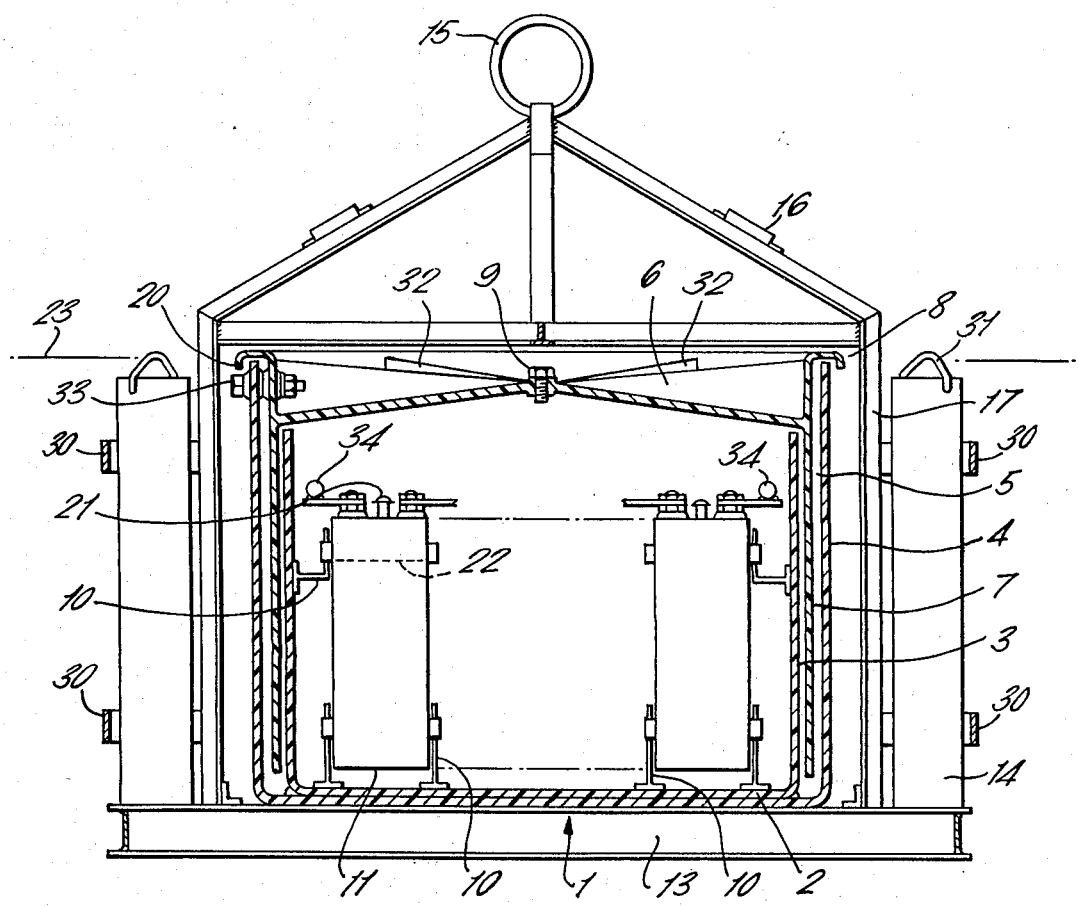
FIG. 1 is a longitudinal section of a battery holder.
Figure 2:
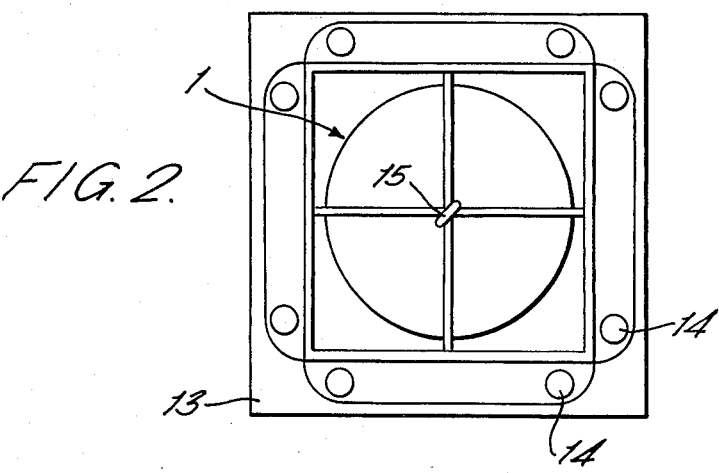
FIG. 2 is a plan view on a reduced scale.

The holder indicated generally at 1 comprises a container 2 having an inner wall 3 and an outer higher wall 4 defining an annular space 5 and a cover 6 having a downwardly extending skirt 7 co-operating with the annular space 5. The container 2 is cylindrical and the annular space 5 is defined by the inner and outer walls 3 and 4 forming the surfaces of two coaxial cylinders.

The skirt 7 extends downwardly almost to the bottom of the annular space 5. The cover 6 has an upwardly and outwardly extending projection 8 which is turned over to fit over the top of the outer wall 4. The top of the cover 6 which is of domed form has a vent hole closeable by plug 9 below the level of the rim of the outer wall 4 for permitting escape of oil when the cover is lowered into position and has stiffening webs 32. At the bottom of the container 2 are clamps 10 for supporting battery 11 with the base of the latter not in contact with the bottom of the container. Further supporting clamps 10 are mounted on the inside of the inner wall 3. Each cell of the battery has a vent 21 and an electrolyte level shown at 22. Two cable terminals 34 are provided.

The cover 6 is secured in position by means of nut and bolt 33.

The entire volume of the container 1 is filled with a hydrocarbon oil and the container 1 is mounted on a steel base 13 with lifting frame 17 having anodes 16 for cathodic protection and a lifting ring 15. Fixed to the exterior of the frame 17 and mounted on the steel base 13 are ballast weights 14, held by steel straps 30 and having lifting hooks 31.

The inner and outer walls 3 and 4 and the skirt 7 are so made that a cable (not shown) can pass from the battery 11 over the inner wall 3, under the extremity of the skirt 7 and over the outer wall 4 to the exterior.

In use the cells of the battery 11 which are twenty individual nickel-cadmium cells filled with caustic potash electrolyte are placed in the container 2 and supported by clamps 10 on the base and inside of the inner wall 3. A hydrocarbon oil having a specific gravity less than that of water is then poured in to cover the cells to the level shown at 23. The oil not only covers and surrounds the cells but enters the cells themselves through vents 21 to fill the spaces above the electrolyte. The cover 6 with plug 9 removed is then lowered so that the skirt 7 goes into the annular space 5 and the outwardly turned portion of the projection 8 fits over the outer wall 4 and is fixed firmly by clamp bolts 20. Excess oil escapes through the vent hole at the top of the cover and is removed. The plug 9 is then inserted and the cover 6 secured by means of nut and bolt 33. The container is then placed inside the frame 17 on the steel base 13. The entire apparatus is then ready for submerging under water. Any water that gets past the turned over portion of the cover enters the space between the cover and the outer wall 4. Being heavier than the oil the water sinks to the bottom of annular space 5 where it stays.

The container described above subjects the cells to the water pressure outside the container and all the components of the cells are therefore pressure balanced.

The twenty cells are given sufficient power to operate a valve actuator for a sub sea oil well. Since the unit is pressure balanced a tight seal in the base is not necessary.

I claim:

1. A holder suitable for protection of electrical equipment in an underwater location comprising: a container having an inner wall and an outer wall defining a space therebetween, said outer wall and said inner wall extending upwardly from a bottom means, a removable cover having a downwardly extending skirt intermediate the outer wall and inner wall and which extends downwardly into the space defined by the inner wall and outer wall such that, when the container is filled with an electrically non-conducting water-immiscible liquid and the holder submerged underwater, then ingress of water into the container and egress of liquid from the container are prevented, said outer wall being higher than said inner wall and said cover having an upwardly and outwardly extending projection fitting over the outer wall of the container, and access means for an electrical connection between the interior of the container and the exterior.

2. A holder as claimed in claim 1 wherein the access means for an electrical connection is provided by having a space between the top surface of the inner wall and the cover, a space between the bottom surface of the skirt and the inner surface of the bottom means of the container and a space between the top surface of the outer wall and the cover so that a cable can pass from the equipment in the container over the inner wall, under the extremity of the skirt and over the outer wall to the exterior.

3. A holder as claimed in claim 1 wherein the container has support means extending upwardly from the inner surface of the bottom means whereby electrical equipment can be totally surrounded by liquid.

4. A holder as claimed in claim 1 wherein the skirt extends at least three quarters of the way down into the space defined by the inner and outer walls.

5. A holder as claimed in claim 1 wherein the holder is supported on a base to which is connected ballast means.

6. A method of employing a holder as claimed in claim 1 which method comprises installing a battery in the container of the holder, covering the battery with a water-immiscible non-electrically conducting liquid, fixing the cover in position and lowering the holder and battery to an underwater location.

7. A holder suitable for protection of electrical equipment in an underwater location comprising: a container having an inner wall and an outer wall defining a space therebetween, said outer wall and said inner wall extending upwardly from a bottom means, a removable cover having a downwardly extending skirt intermediate the outer wall and inner wall and which extends downwardly into the space defined by the inner wall and outer wall such that, when the container is filled with an electrically non-conducting water-immiscible liquid and the holder submerged underwater, then ingress of water into the container and egress of liquid from the container are prevented, said cover having a closeable aperture which is below the level of the rim of the outer wall for permitting escape of excess liquid when the cover is moved into position, and access means for an electrical connection between the interior of the container and the exterior.

8. A holder suitable for protection of electrical equipment in an underwater location comprising: a container having an inner wall and an outer wall defining a space therebetween, said outer wall and said inner wall extending upwardly from a bottom means, a removable cover having a downwardly extending skirt intermediate the outer wall and inner wall and which extends downwardly into the space defined by the inner wall and outer wall such that, when the container is filled with an electrically non-conducting water-immiscible liquid and the holder submerged underwater, then ingress of water into the container and egress of liquid from the container are prevented, and access means for an electrical connection between the interior of the container and the exterior, and an electrical battery in the interior of the container which is totally surrounded by a lighter than water oil.

* * * * *